Jan. 14, 1936.  J. H. HAMMOND, JR  2,027,529
NAVIGATIONAL GUIDE SYSTEM
Original Filed Oct. 29, 1929  2 Sheets-Sheet 1
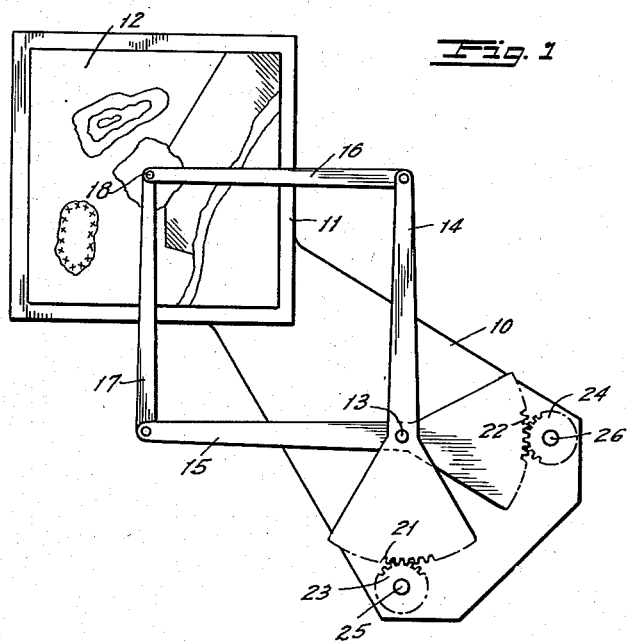
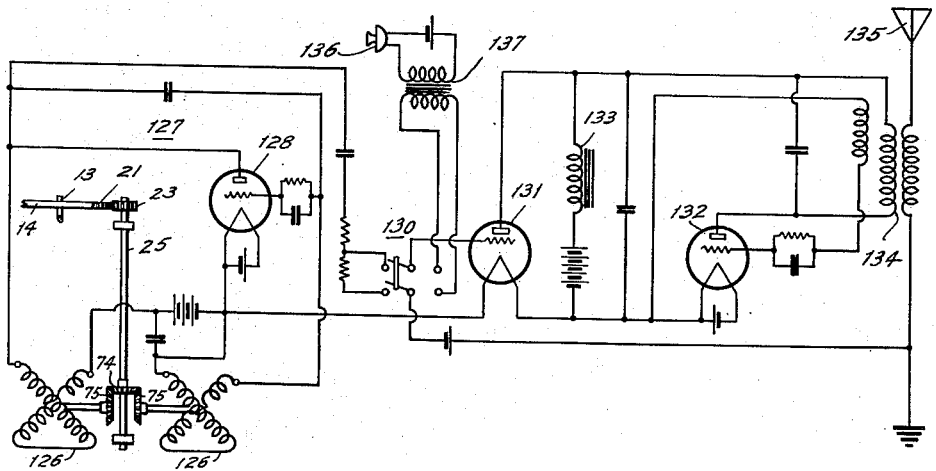
INVENTOR.
BY John Hays Hammond, Jr.,
Albert M. Austin
ATTORNEY

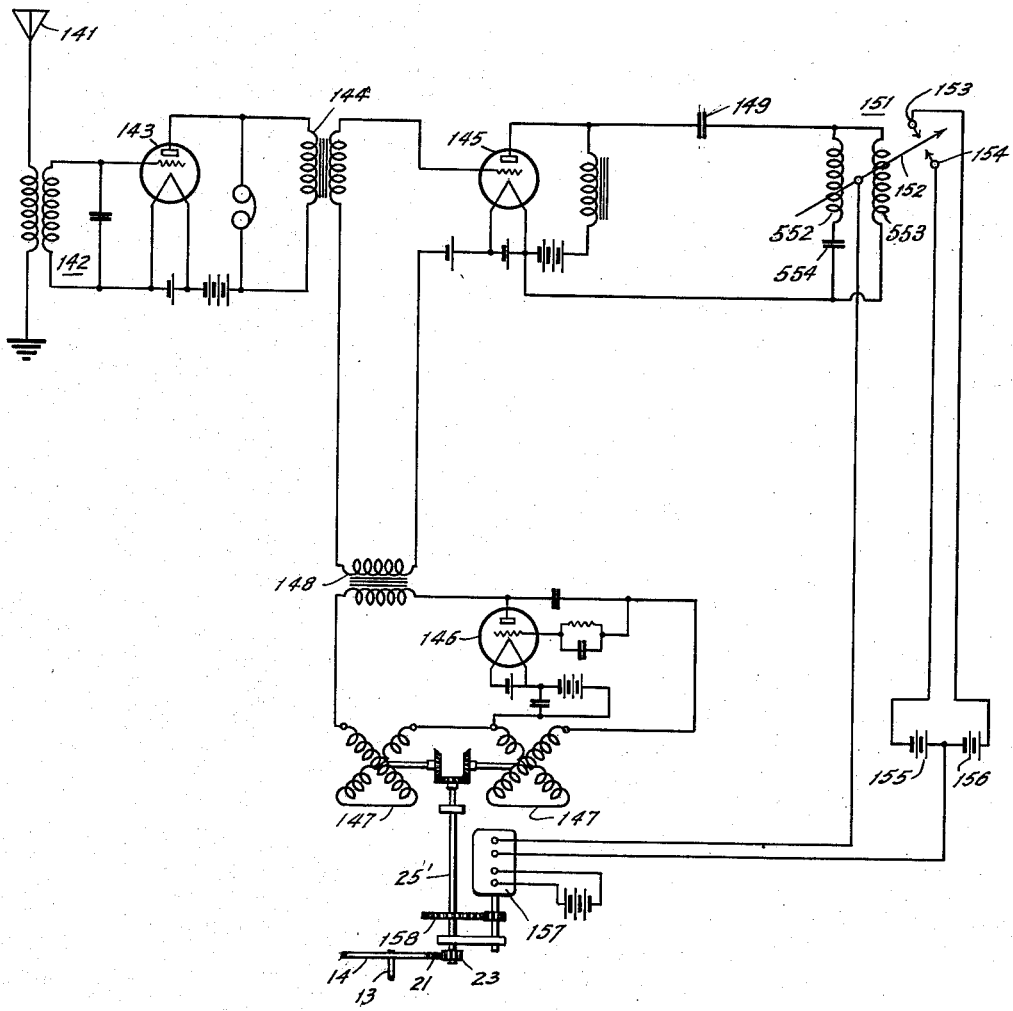

Patented Jan. 14, 1936

2,027,529

UNITED STATES PATENT OFFICE 2,027,529

NAVIGATIONAL GUIDE SYSTEM

John Hays Hammond, Jr., Gloucester, Mass.

Application October 29, 1929, Serial No. 403,206
Renewed September 26, 1935

7 Claims. (Cl. 250—2)

This invention relates to a navigational guide system and more particularly to a system for designating to a pilot his position with reference to a fixed location. The present invention represents another modification of the invention disclosed in a copending application Serial No. 403,205, filed October 29, 1929 by John Hays Hammond, Jr., and entitled "Navigational guide system".

The present invention as specifically applied to an aeronautical guide system provides means whereby the pilot of an aircraft may be informed of his position with reference to a landing field and is particularly adaptable in cases where the visibility is poor. The system is advantageous in cases where the aircraft is flying at night or in foggy weather or when a cloud intervenes in between the aircraft and the landing field.

According to the present invention the azimuthal course of the craft in respect to a fixed location is determined by any suitable means and reproduced in miniature scale upon a plotting surface. A member is provided for tracking the course generated upon said surface. Means actuated in response to the movement of the tracking member are provided for propagating signals having characteristics which vary in accordance with the said movement.

In the craft, a map is provided having outlined thereon the characteristics of the scenery adjacent to the landing field. A member is mounted in designating relationship with respect to said map. Receiving means are also provided in a craft for translating said signals into corresponding mechanical actuations. These mechanical actuations are transmitted to the designating member which generates thereby a course over the map corresponding to the course of the airplane with respect to the field. A recording element may be attached to the designating member so that the course of the airplane can be graphically represented on the map.

This invention is described with reference to its application to an aircraft but it is obvious that it may be be also applied to any other moving craft such as a boat or submarine, etc.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a plan view of certain mechanical structure employed in conjunction with the transmitting and receiving apparatus.

Fig. 2 is a diagrammatic view of the angle setting transmission system and

Fig. 3 is a diagrammatic view of the angle setting receiving system.

Like reference characters denote like parts in the several figures of the drawings.

In the following description and in the claims parts will be identified by specific names for convenience, but they are intended to be as generic in their application to similar parts as the art will permit.

In the form of the invention shown in the accompanying figures, a base plate 10 is provided having attached thereto a frame 11. Mounted in this frame 11 is a plotting surface 12 upon which may be outlined the characteristics of the scenery adjoining the landing field.

Secured to the base plate 10 is a pantographic system comprising a pivot shaft 13 upon which are movably mounted two link members 14 and 15. To one end of each member 14 and 15 there are pivoted two arms 16 and 17 respectively, the other ends of these arms being pivoted to a rod 18. The lower end of this rod 18 is provided with a pointer resting on the map 12, so that this rod with its associated pointer serves as a tracking member. The tracking member may take the alternative form of an eyepiece, having mounted thereon a suitable lens system, and a set of cross hairs adapted for indicating the central point of this lens system.

The other ends of the members 14 and 15 are provided with segmental gears 21 and 22 which mesh with pinions 23 and 24 secured to shafts 25 and 26.

Each of the shafts 25 and 26 is connected to an angle setting transmission apparatus diagrammatically shown in Fig. 2. These transmission systems are adapted to propagate signal waves having frequencies which vary in accordance with the angular position of the shafts 25 and 26 with which they are associated. The lower end of these shafts carry a bevel gear 74 which meshes with two bevel gears 75, 75 pinned to the shafts of the two variometers 126—126 respectively. This pair of variometers 126 is connected to an oscillating circuit 127 of a space discharge oscillator 128. The particular type of oscillator forms no part of the present invention and is not described in detail.

The frequency of the current generated by the oscillator 128 is determined by the inductance of variometers 126 which are in turn controlled by the position of shaft 25.

Oscillator 128 is connected to a radio transmitting system of any convenient type through double pole, double throw switch 130. The transmitting system is shown as comprising the usual transmitter for radio telephone and comprises a space discharge modulator 131, and high frequency oscillator 132, which are connected through a suitable coupling circuit including inductance 133.

Oscillator 132 is coupled through inductances 134 to a radiating system including antenna 135. Microphone 136 is connected through a transformer 137 to a switch 130 in such manner that modulator 131 and oscillator 132 may be used for speech transmission with microphone 136, or for transmission of high frequency currents, modulated in accordance with the oscillations of oscillator 128. In the latter case it is evident that the frequency radiated is a carrier wave modulated by the frequency generated by the oscillator 128 and determined by the angular setting of the shaft 125.

The receiving apparatus is located in the plane, and is similar in construction to that shown in Fig. 1, except that the pointer on the rod 18 is replaced by a suitable designating member, which may have attached thereto a marking tool, such as a pencil or inking device. The map 12 in the plane may have indicated thereon the elevation of the various objects outlined on the map.

The shafts 25' and 26' (in the plane) are connected to the shafts of the angle setting receiving apparatus shown in Fig. 3. In this system the arrangement is such that shaft 25' assumes an angular position corresponding to the frequency of modulation of the received radiant signal and consequently to this position of the shaft 25 in the angle setting transmission system of Fig. 2. This is accomplished by associating the receiving antenna 141 with the input circuit 142 of a radio receiver 143. The output circuit of said receiver is connected through transformer 144 to a space discharge rectifier 145. An oscillator 146 is connected to an oscillating circuit of any suitable design including variometers 147 which are mechanically connected to a shaft 25'.

Said oscillating circuit 146 is coupled through a transformer 148 to the input circuit of a rectifier 145. The output circuit of this rectifier is connected through a condenser 149 to a dynamometer 151 which consists of two coils 552 and 553 and a condenser 554 which is in series with the coil 552. This dynamometer is constructed with a fixed coil 552 and a movable coil 553 to which is attached a rotatable arm 152. A condenser 554 is in series with a coil 552. This coil and condenser are tuned to the difference frequency between that produced by the oscillator 128 of Figure 2 and the oscillator 146 of Figure 3. When the current passing through the dynamometer has this difference frequency the current in the coil 552 will be shifted 90° with respect to the current in the coil 553, so that they will be in phase quadrature. Under these conditions, there will be no reaction between the two coils, and therefore the torque on the arm 152 will be zero.

If the frequency of the oscillator 128 is changed due to motion of the shaft 25, the difference frequency produced by the rectifier 145 will be greater or less than the predetermined difference frequency depending upon which direction the shaft was turned. As soon as the frequency of the current supplied to the dynamometer 151 is changed, the angular relation of the currents in the windings 552 and 553 will be changed so that they are no longer in phase quadrature, thus causing a torque to be produced on the arm of 152. The direction of this torque being dependent upon whether the difference frequency is greater or less than the predetermined frequency.

It is thus seen that when the shaft 25 is rotated, it will cause the arm 153 to engage either the contact 152 or 154, which in turn will cause the motor 157 to be rotated, thus turning the shaft 25' an amount sufficient to cause the oscillator 156 to produce a frequency different from that produced by the oscillator 128 an amount equal to the predetermined frequency. The dynamometer 151 is provided with a rotatable arm 152 which makes contact at certain times with one or the other of two contacts 153 and 154. These contacts are connected through batteries 155 and 156 to a motor 157 which is mechanically connected to shaft 25' by gears 158.

The oscillating circuit 128 with the variometer 126 of Fig. 2 is so proportioned with respect to the oscillating circuit 146 with the variometers 147 of Fig. 3 that when the shafts 25 and 25' are in corresponding positions the difference frequency between the oscillator 146 of Fig. 3 and the oscillator 128 of Fig. 2 will be the same irrespective of the angular setting of the shafts.

The torque on the arm 152 is proportional to the currents through the windings 552 and 553 and the cosine of the phase difference of these currents. The condenser 554 and the coil 552 are tuned to the frequency equal to the difference of frequency between that produced by the oscillator 146 of Fig. 3 and the oscillator 128 of Fig. 2 when the shafts have the corresponding settings. The operation of the dynamometer is as follows:

When the beat frequency is equal to the frequency to which circuit 552, 554 is tuned, that circuit acts as a pure resistance and current flowing therein is in phase with voltage across the circuit.

The current in 553 however is lagging by 90° since 553 is presumably a pure inductance. Hence, current in circuit 552, 554 in phase quadrature with current in 553 and the armature 152 is not affected. If the beat frequency rises the condenser reactance tends to lessen so that circuit 552, 554 becomes more inductive. Therefore, the current in that circuit tends to lag the voltage across its terminals the same as in circuit 553 hence the two actions add and the armature 152 is rotated in one direction. When the beat frequency becomes lower than the critical value the reactance of the coil 552 tends to disappear and capacity 554 becomes the main reactance in that circuit. It follows therefore that the current in circuit 552, 554 leads the voltage across the circuit terminals. The phase of the current being of opposite sense to the current in circuit 553 hence the two currents have opposing effects and armature 152 is rotated in the opposite direction. Therefore, when the frequency produced by the rectifier 145 is equal to this difference of frequency, the currents through the two dynamometer windings 552 and 553 are in phase quadrature and no torque results on the arm 152. However, if the beat frequency is either higher or lower than this particular frequency then a torque in one direction or the other is produced, thereby causing the arm 152 to engage contact with either the contact 153 or 154, thus causing the motor 157 to be rotated in one direction or the other which in turn rotates the shaft 25' so as to adjust the variometers 147 to produce a frequency which when combined with a frequency produced by the oscillator 128 will produce the desired beat frequency. This reduces the torque on the arm 152 to zero, which is then brought back to a central position out of engagement with either contacts 153 or 154 by means of a spring not shown, thus stopping the rotation of the motor 157. It is thus seen that the shaft 25' will be caused to follow the motion of the shaft 25 in this way transmitting the angle through which the shaft 25 has been turned to the shaft 25'.

In the operation of this invention, the azimuthal position of the airplane with respect to the landing field is plotted on the map 12 by any well-known system, which need not be more fully described herein. The pointer on the rod 18 is then caused to track the position of the plane as plotted on the map 12, thus causing the shafts 25 and 26 to be rotated through corresponding angles. The rotation of these shafts will cause a similar rotation of the shafts in the receiving apparatus located in the plane as heretofore described, thus causing the members 14 and 15 to be moved through the same angles as the corresponding members of the transmitter. This will cause the marker on the end of the rod 18 in the airplane to be located at the same place on the map 12 as the pointer on the rod 18 is located on the corresponding map 12 at the transmitting apparatus on the ground. As the pointer on the rod 18 of the transmitting apparatus is moved to follow the changing position of the plane, the marker on the rod 18 of the receiving apparatus in the plane will move over the map 12 in the same manner, effecting thereby a record of the progress of the plane across this map. The pilot may, therefore, see at any moment irrespective of the obscurity of the ground below, what his azimuthal position is with respect to the landing field and the direction which he is travelling with respect thereto. The plane may also be provided with suitable altimeters for indicating its vertical position with respect to the ground.

Also by estimating the speed of motion of the marker, the pilot may estimate his relative speed with respect to the ground. In this way the pilot is given a graphic representation of his progress toward the field and an accurate survey of his position with respect thereto, so that he may effect thereby a safe landing. It is to be understood that in the system described the shaft 26 of the transmitting pantograph controls a system similar to Figures 2 and 3 and that said system operates a shaft corresponding to 26 in the receiving pantograph system.

While certain novel features of the invention has been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a system for designating to a pilot of a craft his position with reference to a known point in combination a plotting surface located at a distance from the craft, means for tracing a course on said surface similar to the course generated by the craft with respect to the surrounding terrain comprising means adapted to resolve the motion of said first named means into rectilinear components, means for generating a plurality of carrier energy waves, means for modulating said carrier waves in accordance with the movement of said first named means and propagating the resultant energy, means in the craft for intercepting said propagated energy and deriving therefrom the modulations, a source of local oscillations and means for comparing the frequencies of the last named oscillations with the frequencies of the derived modulations, and means controlled thereby for varying the frequency of said local oscillations, and means including a plotting device responsive to said comparing means for graphically representing to the pilot of the craft his course with reference to the fixed location.

2. A navigational guide system comprising a plotting surface, means for generating with respect to said surface the course of a craft with respect to a fixed location, a member arranged to track the said generated course, a plurality of shafts, pantographic means for rotating said shafts in accordance with the position of said member, an oscillation generator associated respectively with each of the shafts, each generator including means for controlling the frequency of oscillations generated thereby, means for controlling said frequency controlling means in accordance with the rotation of the associated shaft, means for transmitting said oscillations to said craft, means on said craft for intercepting the transmitted oscillations, means at said craft for generating oscillations of a predetermined frequency, means for comparing the frequency of the transmitted oscillations and the frequency of the locally generated oscillations, a plotting device and means associated with said plotting device responsive to the difference in frequency between said two oscillations for indicating the position of the craft on said plotting device with reference to a fixed location.

3. In a system in accordance with claim 2 wherein said frequency comparing means comprises a modulating circuit having an input and an output circuit, the output circuit including a series tuned circuit and a parallel reactance circuit.

4. In a system as described in claim 2 wherein said frequency comparing means comprises a pair of dynamometer control fields one of said fields comprising a tuned circuit, a motor associated with the plotting device and means controlled by said dynamometer for determining the operation characteristics of said motor.

5. In a navigational guide system, a plotting surface, means for generating with respect to said surface the course of a craft with respect to a fixed location, a member arranged to track the generated course, a plurality of shafts, pantographic means for rotating said shafts in accordance with the movements of said tracking member, an oscillation generator associated respectively with each of said shafts, each generator being provided with operable means for controlling the frequency of oscillations generated thereby, each of said frequency controlling means being operated in accordance with the rotation of the associated shaft, means for transmitting the oscillations from all of said generators to the craft, means on the craft for receiving the transmitted oscillations, a plurality of local oscillation generators on the craft the number thereof corresponding to the number of said shafts, each generator being related to one of said shafts, means for comparing the frequency of each of the locally generated oscillations and the related transmitted oscillations, means including electric driving instrumentalities for controlling the local oscillation generators and means controlled by the last two named means for maintaining the frequency of oscillations generated by each of the local oscillators a constant frequency difference apart from the related transmitted oscillations and plotting means on said craft responsive to said driving instrumentalities for indicating to the pilot of the craft his position with reference to a fixed location.

6. In a navigational guide system, a plotting surface, means for generating with respect to said surface the course of a craft with respect to a fixed location, a member arranged to track the generated course, a plurality of shafts, pantographic means for rotating said shafts in accordance with the movements of said tracking member, an oscillation generator associated respectively with each of said shafts, each generator being provided with operable means for controlling the frequency of oscillations generated thereby, each of said frequency controlling means being operated in accordance with the rotation of the associated shaft, means for transmitting the oscillations generated by all of said generators to the craft, means on the craft for receiving the transmitted oscillations, a plotting surface on the craft corresponding to the first named plotting surface, pantographic means on the craft including an indicator associated with the plotting surface, a plurality of shafts on the craft corresponding in number and in position with respect to the plotting surface on the craft to the number and position of the first named plurality of shafts with respect to the first named plotting surface, an oscillation generator associated respectively with each of the shafts on the craft, each generator being provided with operable means for controlling the frequency of oscillations generated thereby, each of said frequency controlling means being operated in accordance with the rotation of the associated shaft, means on the craft for comparing the frequency of each of the locally generated oscillations with the related transmitted oscillations, a plurality of electric driving means on the craft each one thereof being associated with one of the shafts on the craft and means controlled by the last two named means for maintaining the frequency of oscillations generated by each of the local oscillators a constant frequency difference apart from its respective related transmitted oscillations said last named means acting upon the rotatable shafts on said craft to operate the pantographic means on the craft for indicating to the pilot of the craft his position with reference to a fixed location.

7. A navigational guide system comprising a plotting surface, means for generating with respect to said surface, the course of a craft with respect to a fixed location, means arranged to track the said generated course, a plurality of shafts, pantographic means for rotating the shafts in accordance with the position of said member, a source of oscillations associated respectively with each of the shafts, each source including means for controlling the frequency of oscillations, means for controlling the frequency controlling means in accordance with the rotation of the associated shaft, means for transmitting said oscillations of said craft and means on the craft for intercepting the transmitted oscillations and plotting therefrom, the position of the craft with reference to a fixed location, said last named means comprising a frequency comparing device associated with a local source of oscillations, said frequency comparing device being arranged so as to compare the frequencies of the received oscillations and the locally generated oscillations.

JOHN HAYS HAMMOND, Jr.